March 7, 1944.  S. SCHNELL  2,343,809
FLUID PRESSURE SYSTEM
Filed Jan. 14, 1942
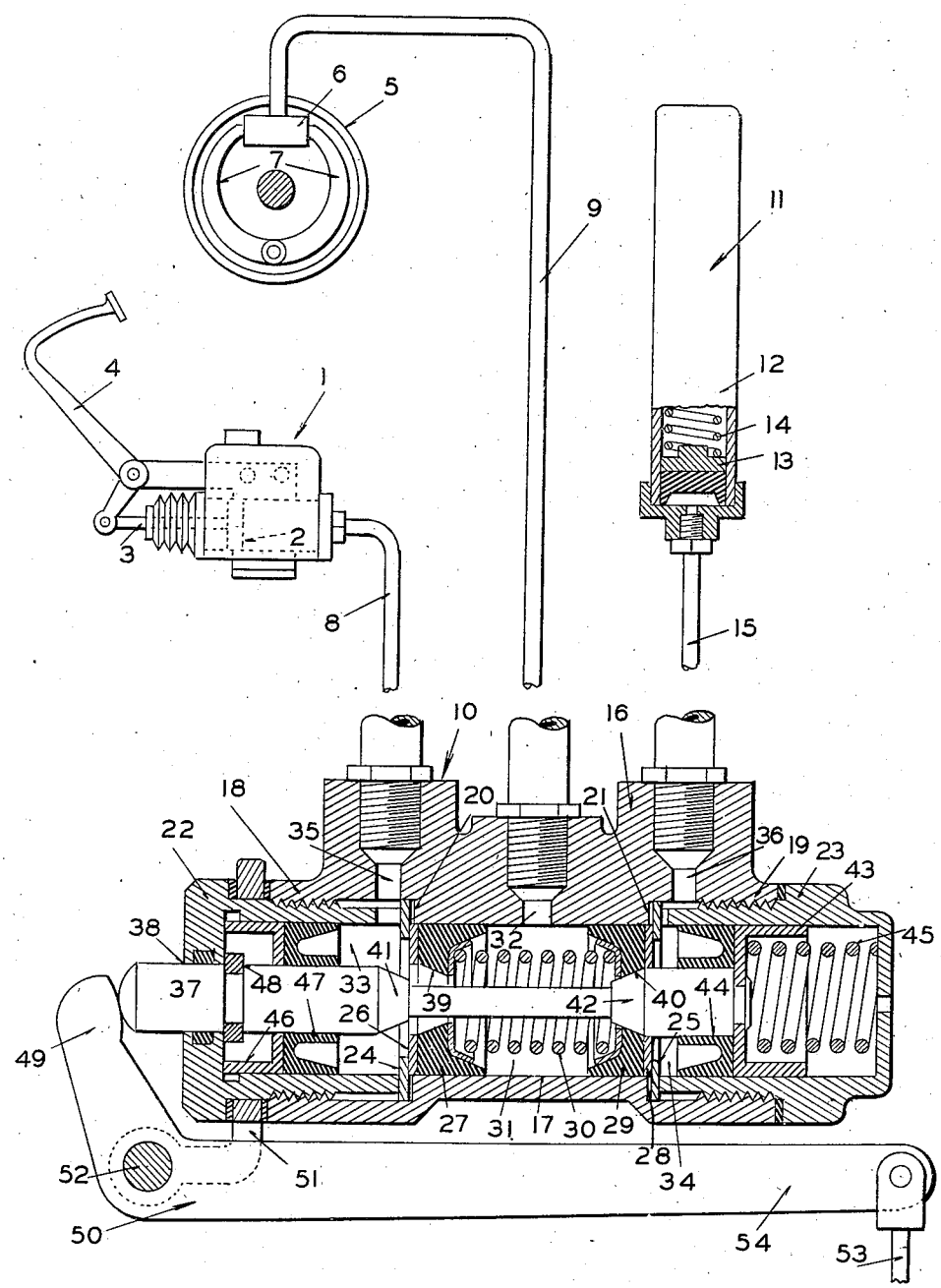
INVENTOR
STEVE SCHNELL
BY
ATTORNEY Patented Mar. 7, 1944

2,343,809

UNITED STATES PATENT OFFICE 2,343,809

FLUID PRESSURE SYSTEM

Steve Schnell, Kirkwood, Mo., assignor to Wagner Electric Corporation, St. Louis, Mo., a corporation of Delaware Application January 14, 1942, Serial No. 426,699

14 Claims. (Cl. 60—54.5)

My invention relates to fluid pressure systems and more particularly to valve means for controlling said systems.

One of the objects of my invention is to produce an improved fluid pressure system wherein the fluid pressure employed to actuate a device can be trapped therein when desired and automatically released by re-application of pressure from the pressure source.

Another object of my invention is to produce an improved valve means for preventing the release of applied fluid pressure which is caused to be operative by manually-controlled means and inoperative to thereby release the applied fluid pressure by merely again applying pressure.

Still another object of my invention is to produce an improved fluid pressure actuating system which has associated therewith valve means for preventing release of the applied pressure and a pressure maintaining means which is only caused to be operative when fluid pressure is prevented from being released by the valve means.

Other objects of my invention will become apparent from the following description taken in connection with the accompanying drawing in which the single figure is a schematic view of a fluid pressure actuating system embodying my invention, the control valve being enlarged and shown in section.

Referring to the figure in detail, the numeral 1 indicates a pressure producing device in the form of a hydraulic master cylinder, the piston 2 of which is actuated by a rod 3 and a pedal 4. The device to be actuated is shown as a brake 5 although it may be any other device desired. A fluid motor 6 actuates the brake shoe 7 and said motor is connected with the master cylinder by conduits 8 and 9 which have associated therewith my improved control valve mechanism generally indicated by the numeral 10. The fluid pressure system also has associated therewith a pressure maintainer 11 comprising a cylinder 12, a piston 13, and a strong spring 14 acting on the piston. This pressure maintainer is also controlled by the control valve mechanism 10 and is adapted to be connected to the fluid motor 6 only under certain conditions. A conduit 15 leads from the maintainer 11 to the control valve.

My improved control valve mechanism 10 is employed to trap fluid pressure in the motor 6 when desired and to substantially simultaneously connect the maintainer to the motor so that said trapped fluid pressure will be maintained indefinitely notwithstanding contraction of the fluid due to a decrease in temperature all of which will become apparent.

My improved control valve mechanism comprises a casing 16 having a through bore 17 formed with enlarged threaded ends 18 and 19 whereby shoulders 20 and 21 are provided. The threaded end 18 is closed by a threaded cylindrical plug 22 and the threaded end 19 is closed by a threaded plug 23, the internal diameters of said plugs corresponding to the central part of bore 17. The inner end of plug 22 holds an annular washer 24 between it and the shoulder 20, and the inner end of plug 23 holds a like annular washer 25 between it and the shoulder 21 to thus provide spaced apart abutments.

Associated with the inner side of washer 24 is an annular washer 26 forming a wall for a packing cup 27, and associated with the inner side of washer 25 is an annular washer 28 forming a wall for a packing cup 29. The lips of the packing cups face each other and are held against their respective walls by an interposed spring 30. The cups 27 and 29, together with the central part of bore 17, form a central chamber 31 which is connected by a passage 32 to conduit 9 leading to fluid motor 6. On opposite sides of this central chamber are end chambers 33 and 34, chamber 33 being in plug 22 and end chamber 34 being in plug 23. A passage 35 connects chamber 33 to conduit 8 leading from the master cylinder and a passage 36 connects chamber 34 to conduit 15 leading to the maintainer 11.

Positioned in chambers 31, 33 and 34 is a rod 37 extending to the exterior of the casing through a packed opening 38 in plug 22. In order that the rod may extend through the packing cups, cup 27 is provided with a tapered or conical aperture 39 and cup 29 is provided with a tapered or conical aperture 40, both of said apertures having their surfaces converging toward chamber 31. The central part of the rod is of reduced diameter and between this portion and the end portions of the rod are conical portions 41 and 42 for cooperation with conical apertures 39 and 40, respectively. The conical portions 41 and 42 are spaced apart a greater distance than the conical apertures so that only one of the conical portions can engage its cup cooperating surface at one time.

The end of rod 37 which extends into chamber 34 carries a piston 43 and associated therewith is a packing cup 44. A spring 45 is interposed between the end of the piston and the end of plug 23 and normally biases the rod to a position where the conical portion 42 engages the surface of aperture 40 and the conical portion 41 is disengaged from the surface of aperture 39.

In chamber 33 there is positioned a piston 46 which is loosely mounted on rod 37. Associated with this piston is a packing 47. In order that the piston may be moved from its normal position where it abuts the closed end of plug 22, there is provided on the rod a collar 48, said collar abutting the end of the plug and determining the extent of movement of the rod to the left, as shown in the figure. This collar can engage piston 46 only after a predetermined movement of the rod to the right, said predetermined movement being less than that necessary to place the conical portion 41 of the rod in engagement with the conical surface of the aperture 39. The end of the rod which extends out of plug 22 is adapted to be engaged by an arm 49 of a bellcrank lever 50, said lever being pivoted on a bracket 51 by means of pin 52. This bracket is secured to the casing by being clamped between the casing and plug 22. The bellcrank lever is operated to move the rod to the right, as viewed in the figure, by actuating link 53 pivotally connected to the other arm 54 of the bellcrank lever.

Referring to the operation of the above described fluid pressure system, the parts of the control valve when said valve is inoperative, will be in the positions shown in the figure. Under these conditions spring 45 will hold rod 37 in a position where the conical portion 42 is engaged with the surface of the conical aperture 40 in cup 29. The conical portion 41 of the rod will be disengaged from the surface of the conical aperture 39 in cup 27. Thus it is seen that communication between the maintainer 11 and either the master cylinder or the fluid motor 6 is cut off. The master cylinder, however, is in free two-way communication with the fluid motor. Thus if the master cylinder is operated, the fluid motor will be actuated. When the master cylinder is released by release of the pedal 4, the fluid under pressure acting in the fluid motor will be released. It is to be noted that when the parts of the control valve are in the positions shown, there will be no fluid pressure acting on rod 37 to move it to the right against the force of spring 45. The fluid pressure which is effective on the conical portion 42 of the rod tending to move the rod to the right will be counter-balanced by an opposite axial force on the rod caused by the fluid pressure which is acting on the conical portion 41.

If it is desired to trap fluid pressure in fluid motor 6 and to maintain this fluid pressure for an indefinite period, the bellcrank lever 50 is operated by pull on rod 53 after the master cylinder is operated. This will move rod 37 to the right and cause unseating of the conical portion 42, thereby placing chamber 34 in communication with the central chamber 31. As soon as the fluid pressure is effective in chamber 34, it will act on piston 43 and quickly move it to the right as far as permissible. This will cause the conical portion 41 to be brought into engagement with the surface of the conical aperture 39. However, prior to the engagement of these last mentioned conical surfaces, shoulder 48 on the rod will pick up piston 46 and move it slightly to the right. Because the piston is not picked up by rod 37 until after it has been moved some distance, the only resistance to movement of the rod will be spring 45. The master cylinder may now be released and when released the fluid pressure acting on piston 46 is also released. The pressure on piston 43 will then keep spring 45 from returning rod 37 and, therefore, conical portion 41 will be held in contact with conical surface 39, thus trapping fluid in chambers 31 and 34. After release of the master cylinder, the bellcrank lever 50 may be released and the valve will remain in its holding position.

When chamber 34 is connected to the central chamber 31, fluid under pressure is admitted to the pressure maintainer 11 and is effective in moving the piston 13 thereof back against the strong spring 14, thereby compressing said spring. Thus the spring becomes operative to apply a pressure producing force on the fluid in chambers 34 and 31 and the fluid motor 6. Therefore with the pressure maintainer connected into the system, there will be no possibility of contraction of the fluid causing the fluid pressure in the fluid motor to drop to such a low value that the fluid motor will not be so actuated as to hold the brakes or other device applied.

When it is desired to release the trapped fluid pressure in the fluid motor and also in chambers 31 and 34, the master cylinder is again operated and fluid pressure developed. This developed fluid pressure will act upon piston 46 and cause it to move to the left provided, of course, that the pressure acting on the piston is sufficient to move piston 43 against the trapped fluid pressure. Movement of piston 46 to the left will carry with it rod 37 (since the piston is abutting collar 48) and thus cause the conical portion 41 of the rod to become disengaged from the surface of the conical aperture 39 of cup 27. As soon as this disengagement takes place the fluid pressure in all the system, including chambers 33, 31 and 34, the fluid motor and the maintainer 11 will become equalized. Under these conditions spring 45 is effective to move piston 43 and rod 37 to the left and to its inoperative position shown. The fluid pressure trapped in the fluid motor will thus be released whenever the pedal of the master cylinder is released. Fluid pressure which may remain in chamber 34 and the maintainer at the time the conical portion 42 becomes seated can escape to the central chamber 31 by pushing cup 40 off the conical portion 42 and against the action of spring 30 to thus enter chamber 31 and return to the master cylinder.

Thus it is seen that the trapped fluid may be released automatically by depressing the pedal and operating the master cylinder. There is no necessity for releasing the pressure by a manual pushing of rod 37 to the left for if this were attempted, a considerable force would be required due to the fact that all the trapped fluid pressure effective on piston 43 must be overcome. By applying the master cylinder and causing piston 46 to move the rod to the left by fluid pressure, the release of the trapped fluid pressure is accomplished in a very simple and easy manner.

It is also to be noted in connection with the control valve that additional fluid pressure may be applied to the fluid motor, if such is desired, when the parts of the control valve are in the positions to cause fluid pressure to be trapped. This can be accomplished by holding rod 37 in its right-hand position by means of the bellcrank lever and then operating the master cylinder. Fluid pressure developed thereby will then be forced past the periphery of the cup 27 into chamber 31 or past the two engaged conical surfaces. Under these conditions the cup is free to move slightly forward against the action of spring 30.

It is to be noted that the maintainer 11 may be eliminated from the system if such is desired. Under such an arrangement passage 36 will be plugged. The system will then work in the same manner as already described with the exception that no maintainer will be connected into the system when fluid is trapped in the fluid motor to thus compensate for possible contraction of the trapped fluid.

Being aware of the possibility of modifications in the particular structure herein described without departing from the fundamental principles of my invention, I do not intend that its scope be limited except as set forth by the appended claims.

Having fully described my invention, what I claim as new and desire to secure by Letters Patent of the United States is:

1. In a fluid pressure system having a source of pressure and a fluid pressure actuated device connected thereto, a chamber provided with a yieldable wall, means comprising a control valve mechanism operable at will for connecting the chamber to the fluid pressure actuated device and for substantially simultaneously trapping fluid under pressure in said device and in the chamber and thus permitting release of pressure from the source without release of the device, and means associated with said control valve mechanism for automatically releasing the trapped fluid pressure and disconnecting the chamber from said device when fluid pressure from the source is again developed and then released.

2. In a fluid pressure system, a source of pressure, a fluid pressure actuated device, conduit means connecting the source with said device, a chamber having a yieldable wall, valve means associated with said conduit means for preventing return flow of fluid from the actuated device and for also automatically placing said device in communication with the chamber, means for rendering said valve operative at will, and means embodied in said valve means for automatically causing it to again assume an inoperative condition only when a fluid pressure from the source is developed.

3. In a fluid pressure system, a source of pressure, a fluid pressure actuated device, conduit means connecting the source with the device, a chamber having a yieldable wall, valve means associated with said conduit means for preventing return flow of fluid from the actuated device and for connecting the chamber to said device, said valve means embodying valve means movable at will to a position closing communication from the device to the source and substantially simultaneously opening communication between the chamber and said device, means associated with the valve means for maintaining said valve means in said last named condition by the fluid pressure effective in the actuated device and chamber, and means for causing said valve means to return to open position when a fluid pressure from the source is developed.

4. In a fluid pressure system, a source of pressure, a fluid pressure actuated device, control means for trapping fluid under pressure in said device to thus permit release of pressure at the source without release of the device and for also automatically releasing the trapped fluid under pressure when pressure is re-applied by the source, said means comprising two valve means having elements connected to be moved simultaneously and so related to each other that one of the valve means will be closed when the other valve means is open, one of said valve means when closed trapping fluid under pressure in the actuated device, means controlled by the other valve means when open for permitting the trapped fluid pressure to maintain the first valve means closed, means for moving said valve elements at will so that the first named valve means is closed and the second named valve means opened, and means for causing said valve elements to be returned to positions wherein the first named valve means is opened and the second named valve means is closed whenever a predetermined pressure is re-applied from the source.

5. In a fluid pressure system, a source of pressure, a fluid pressure actuated device, a chamber having a yieldable wall, control means for trapping fluid under pressure in said device and connecting the device to the chamber to thus permit release of pressure at the source without release of the device and for also automatically releasing the trapped fluid under pressure when pressure is re-applied by the source, said means comprising two valve means having elements connected to be moved simultaneously and so related to each other that one of the valve means will be closed when the other valve means is open, one of said valve means when closed trapping fluid under pressure in the actuated device, means controlled by the other valve means when open for permitting the trapped fluid pressure to maintain the first valve means closed and for placing the yieldable wall chamber in communication with the device, means for moving said valve elements at will so that the first named valve means is closed and the second named valve means opened, and means for causing said valve elements to be returned to positions wherein the first named valve means is opened and the second named valve means is closed whenever a predetermined pressure is re-applied from the source.

6. In a fluid pressure system, a source of pressure, a fluid pressure actuated device, a chamber having a yieldable wall, control means for trapping fluid under pressure in said device and connecting the device to the chamber to thus permit release of pressure at the source without release of the device and for also automatically releasing the trapped fluid under pressure when pressure is re-applied by the source, said means comprising two valve means having elements connected to be moved simultaneously and so related to each other that one of the valve means will be closed when the other valve means is open, one of said valve means when closed trapping fluid under pressure in the actuated device, means controlled by the other valve means when open for permitting the trapped fluid pressure to maintain the first valve means closed and for placing the yieldable wall chamber in communication with the device, means for moving said valve elements at will so that the first named valve means is closed and the second named valve means opened, means for causing said valve elements to be returned to positions wherein the first named valve means is opened and the second named valve means is closed whenever a predetermined pressure is re-applied from the source, and means for permitting the fluid under pressure in the yieldable wall chamber to return to the source when the second valve means is in a closed position.

7. In a fluid pressure system, a source of pressure, a fluid pressure-actuated device and control means for trapping fluid under pressure in said device, said means comprising a valve means for preventing when closed return flow of fluid from the device to the source but not in the opposite direction, a chamber, a second valve means for preventing when closed communication between either the source and the chamber or said device and the chamber but not in the opposite direction, means for connecting the movable elements of said valve means together for simultaneous movement at will whereby the first named valve means can be closed and the second valve means opened, a member positioned in the chamber and connected to the movable elements of the valve means to maintain the first valve means closed and the second valve means open when fluid pressure is admitted to the chamber, and means for causing the first valve means to be open and the second valve means to be closed when fluid pressure from the source is re-applied.

8. In a fluid pressure system, a source of pressure, a fluid pressure-actuated device and control means for trapping fluid under pressure in said device, said means comprising a valve means for preventing when closed return flow of fluid from the device to the source but not in the opposite direction, a chamber, a second valve means for preventing when closed communication between either the source and the chamber or said device and the chamber but not in the opposite direction, means for connecting the movable elements of said valve means together for simultaneous movement at will whereby the first named valve means can be closed and the second valve means opened, a member positioned in the chamber and connected to the movable elements of the valve means to maintain the first valve means closed and the second valve means open when fluid pressure is admitted to the chamber, and means for causing the first valve means to be open and the second valve means to be closed when fluid pressure from the source is re-applied, said last named means comprising a member subject to fluid pressure from the source and so associated with the connected movable elements of the two valve means as to move said elements only when the first valve means is closed and the second valve means is open.

9. In a fluid pressure system, a source of pressure, a fluid pressure-actuated device, a control valve means for trapping fluid under pressure in said device to thus permit release of pressure at the source and for also automatically releasing the trapped pressure when pressure is re-applied from the source, said valve means comprising a central chamber and two end chambers, said central chamber being connected to the actuated device and one end chamber being connected to the source of pressure, a longitudinally movable member carrying spaced valve elements, spaced valve seats for said elements, said valve elements and valve seats being so associated with each other and the chambers that the central chamber may be alternately connected with the end chambers by a reciprocation of the longitudinally movable member, manual means for moving said reciprocable member and the valve elements to a position where the central chamber is cut off from communication with the end chamber connected to the source and the central chamber is placed in communication with the other end chamber, to thereby trap fluid in the actuated device, the central chamber and said end chamber not connected with the source, means for holding said longitudinal member in the last named position by the trapped fluid pressure, and means for automatically returning the longitudinal member and the valve elements to a position where the central chamber is in communication with the source when a predetermined pressure is again applied from the source.

10. In a fluid pressure system, a source of pressure, a fluid pressure-actuated device, valve means for trapping fluid under pressure in the actuated device and automatically releasing the same when the pressure is re-applied from the source, said valve means comprising a central chamber connected to the actuated device, end chambers one of which is connected to the source of pressure, means comprising a valve element for controlling flow of fluid from the central chamber to one end chamber, means comprising a valve element for controlling the flow of fluid from the central chamber to the other end chamber, means for connecting said valve elements for simultaneous movement so that one valve element will be closed when the other is opened, means for biasing said valve elements to positions where the end chamber connected to the source is in communication with the central chamber and the other valve element is closed, manually operative means for moving said valve elements so that fluid pressure is prevented from flowing from the central chamber to the source and the other valve element is open to place the end chamber which is not connected to the source in communication with the central chamber, means for holding said valve elements in the last named position by the fluid pressure trapped in the central chamber and the end chamber not connected with the source, and means operable by the application of pressure from the source for returning the valve elements to their positions where the central chamber is again in communication with the source but is prevented from communicating with the chamber not connected to the source.

11. In a fluid pressure system, a source of pressure, a fluid pressure-actuated device, a chamber having a yieldable wall, valve means for trapping fluid under pressure in the actuated device whereby the source of pressure can be released without release of the device and for substantially simultaneously placing the chamber and said device in communication with each other, said valve means comprising a central chamber connected to the actuating device, end chambers one of which is connected to the source of pressure and the other to the yieldable wall chamber, apertured walls between the chambers, packing cups positioned adjacent the walls on the sides toward the central chamber and each provided with a tapered aperture, a spring interposed between said cups, a rod positioned in said chambers and extending through the apertures of the walls and cups, said rod being provided with spaced tapered surfaces for alternately engaging the apertures of the cups by longitudinal reciprocation of the rod, a piston secured to the rod and positioned in the end chamber which is connected to the yieldable wall chamber, a spring for biasing said piston and rod to a position where the aperture in the cup adjacent said piston is closed by the cooperating tapered portion of the rod, means for moving said rod forwardly against the bias of the last named spring to thereby unseat said last mentioned tapered portion and causing the other tapered portion of the rod to close the tapered opening of the cup with which it cooperates, a piston in the end chamber connected with the source, and means for connecting said last named piston with the rod to move said rod rearwardly only when in a forward position and sufficient fluid pressure is applied thereto by the source.

12. In a fluid pressure system, a source of pressure, a fluid pressure-actuated device, valve means for trapping fluid under pressure in the actuated device whereby the source of pressure can be released without release of the device, said valve means comprising a central chamber connected to the actuating device, end chambers one of which is connected to the source of pressure, apertured walls between the chambers, packing cups positioned adjacent the walls on the sides toward the central chamber and each provided with a tapered aperture, a spring interposed between said cups, a rod positioned in said chambers and extending through the apertures of the walls and cups, said rod being provided with spaced tapered surfaces for alternately engaging the apertures of the cups by longitudinal reciprocation of the rod, a piston secured to the rod and positioned in the end chamber which is not connected to the source, a spring for biasing said piston and rod to a position where the aperture in the cup adjacent said piston is closed by the cooperating tapered portion of the rod, means for moving said rod forwardly against the bias of the last named spring to thereby unseat said last mentioned tapered portion and causing the other tapered portion of the rod to close the tapered opening of the cup with which it cooperates, a piston in the end chamber connected with the source, and means for connecting said last named piston with the rod to move said rod rearwardly only when in a forward position and sufficient fluid pressure is applied thereto by the source.

13. In a fluid pressure system having a source of pressure and a fluid pressure actuated device connected therewith, a control valve mechanism including a valve element for trapping fluid under pressure in the actuated device and permitting release of pressure from the source without release of the fluid pressure in the device, means operable at will for causing said control valve mechanism to be operable, and means associated with said control valve mechanism for automatically releasing the trapped fluid pressure when fluid pressure from the source is again developed and then released, said means embodying a piston element to be acted on by re-developed fluid pressure for positively moving the valve element to open position, said piston element being so associated with the valve element that it will be operatively connected therewith and capable of being moved by the re-developed fluid pressure only when the valve element is closed.

14. In a fluid pressure system, a source of pressure, a fluid pressure actuated device, conduit means connecting the source with said device, valve means comprising a valve element and stem associated with said conduit means for preventing return flow of fluid under pressure from the actuated device and permitting the pressure from the source to be released, means for rendering the closing of said valve element at will, and means comprising a piston associated with the stem of the valve element for automatically causing said element to again assume an inoperative position when fluid pressure from the source is redeveloped, said piston being so arranged that all the redeveloped pressure is effective in moving the element to inoperative position and said valve element when moved to inoperative position permitting the re-developed pressure to be effective in the fluid pressure actuated device.

STEVE SCHNELL.